(12) United States Patent
Leprovost et al.

(10) Patent No.: US 8,681,854 B2
(45) Date of Patent: Mar. 25, 2014

(54) METHOD AND DEVICE FOR REORDERING AND MULTIPLEXING MULTIMEDIA PACKETS FROM MULTIMEDIA STREAMS PERTAINING TO INTERRELATED SESSIONS

(75) Inventors: Yann Leprovost, Nozay (FR); Olivier Poupel, Saint-Domineuc (FR)

(73) Assignee: Alcatel Lucent, Paris (FR)

( * ) Notice: Subject to any disclaimer, the term of this patent is extended or adjusted under 35 U.S.C. 154(b) by 1097 days.

(21) Appl. No.: 12/364,118

(22) Filed: Feb. 2, 2009

(65) Prior Publication Data
US 2009/0201990 A1  Aug. 13, 2009

(30) Foreign Application Priority Data
Feb. 4, 2008  (EP) .................................... 08290096

(51) Int. Cl.
*G06K 9/36*  (2006.01)
*G06K 9/46*  (2006.01)
(52) U.S. Cl.
USPC .......................................... 375/240; 382/232
(58) Field of Classification Search
None
See application file for complete search history.

(56) References Cited

U.S. PATENT DOCUMENTS

| | | | |
|---|---|---|---|
| 6,430,159 B1 * | 8/2002 | Wan et al. | 370/246 |
| 6,510,177 B1 * | 1/2003 | De Bonet et al. | 375/240.16 |
| 6,973,128 B2 * | 12/2005 | Zhou et al. | 375/240.11 |
| 7,062,096 B2 * | 6/2006 | Lin et al. | 382/232 |
| 7,751,324 B2 * | 7/2010 | Vadakital et al. | 370/231 |
| 8,170,116 B2 * | 5/2012 | Wang et al. | 375/240.25 |
| 2004/0179598 A1 * | 9/2004 | Zhou et al. | 375/240.11 |
| 2006/0008002 A1 * | 1/2006 | Kirenko | 375/240.11 |
| 2007/0110150 A1 * | 5/2007 | Wang et al. | 375/240.1 |
| 2008/0137728 A1 * | 6/2008 | Van Der Stok et al. | 375/240.01 |

OTHER PUBLICATIONS

1. Wenger et al, "RTP Payload Format for SVC Video", IETF Standard Working Group, vol. avt, No. 7, Feb. 1, 2008, pp. 4, 15, 26-29 and 48 2. Wenger et al, "RTP Payload Format for SVC Video", IETF Standard Working Group, vol. avt, No. 6, Jan. 21, 2008, p. 28.*
Wenger et al, "Transport Signaling of SVC in IP Networks, IEEE Transactions on Circuits and Systems for Video Technology", vol. 17. No. 9, Sep. 2007, pp. 1164-1173.*
Wenger et al, "RTP Payload Format for H.264/SVC Scalable Video Coding", Journal of Zhejiang University Science S, 2006, pp. 657-667.*
Mao, et al, "Video Transport Over Ad Hoc Networks: Multistream Coding with Multimedia Transport", IEEE Journal on Delected Areas in Communicatio, vol. 21, No. 10, Dec. 2003, pp. 1721-1737.*
Wenger et al, "RTP Payload Format for SVC Video", Network Working Group, Fraunhofer HHI, Jan. 21, 2008, pp. 25-31.*

(Continued)

*Primary Examiner* — Jay Patel
*Assistant Examiner* — Reza Aghevli
(74) *Attorney, Agent, or Firm* — Fay Sharpe LLP

(57) ABSTRACT

A method for reordering and multiplexing multimedia packets from multimedia data streams (S0, S1, . . . SN) pertaining to interrelated sessions includes a step of searching within the packets of a stream having the highest frame rate amongst said multimedia streams, for a common timing variable (TS) of the packet associated with the next frame of said multimedia data, in a predetermined order related to the encoding process with which said data were encoded, and a step of providing the packets in said predetermined order across said sessions in the order of the session interdependency. A device for performing this method is disclosed as well.

11 Claims, 6 Drawing Sheets

(56) References Cited

OTHER PUBLICATIONS

Figure 1:
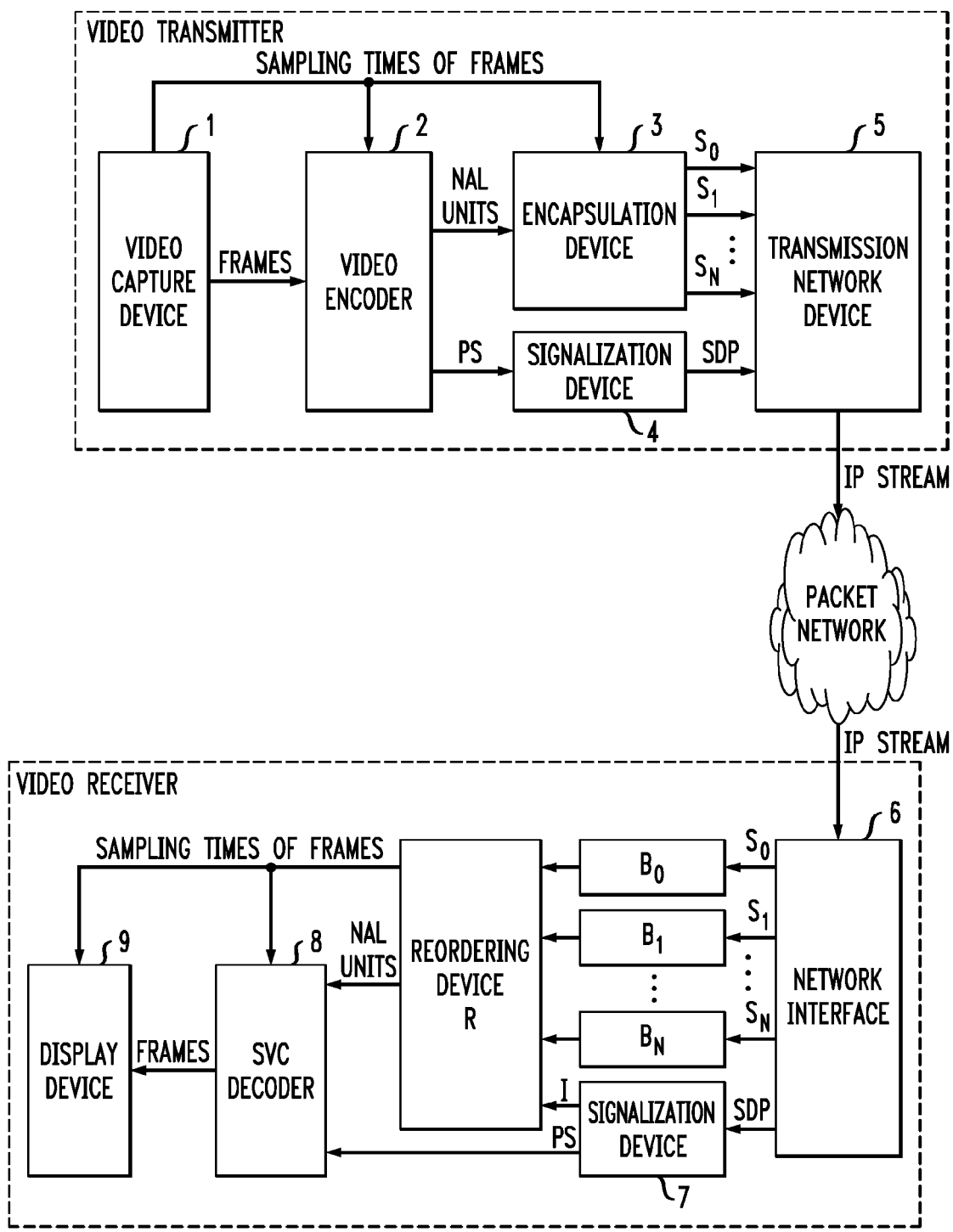

Wenger et al, "Transport and Signaling of SVC in IP Networks", IEEE Trans. Circuits and Systems for Video Technology, vol. 17, No. 9, Sep. 2007, pp. 1164-1173.*

Wenger, Y-K Wang, Nokia, T. Schierl, Fraunhofer HHI: "RTP Payload Format for SVC Video," IETF Standard Working Draft, Internet Engineering Task Force, IETF, CH, Online, vol. avt, No. 7, XP002504445, Feb. 1, 2008.

Wenger, Y-K Wang, Nokia, T. Schierl, Fraunhofer HHI: "RTP Payload Format for SCV Video," IETF Standard Working Draft, Internet Engineering Task Force, IETF, CH, vol. avt, No. 6, XP015053082, Jan. 21, 2008.

Wenger S. et al., "Transport and Signaling of SVC in IP Networks," IEEE Transactions on Circuits and Systems for Video Technology, IEEE Service Center, Piscataway, NJ, US, Vo. 17, No. 9, XP011193023, pp. 1164-1173, Sep. 1, 2007.

European Search Report.

\* cited by examiner

METHOD AND DEVICE FOR REORDERING AND MULTIPLEXING MULTIMEDIA PACKETS FROM MULTIMEDIA STREAMS PERTAINING TO INTERRELATED SESSIONS

Priority is hereby claimed under §119 and 365(b) to European Patent Application No. 08290096.0 filed Feb. 4, 2008.

The present invention relates to a method and a device for reordering and multiplexing multimedia packets from multimedia data streams pertaining to interrelated sessions.

Such methods are for instance of importance for scalable video codec encoded data streams which are transported using the real time transport protocol.

Scalability in video coding and transmission has become more and more important the last years. Scalable video coding, hereafter abbreviated by SVC, is specified in the annex G of the H.264/AVC standard as can be found from the ITU-T recommendation H.264/ISO/IEC IS 14496-10 AVC, 2005 Amendment 3. In the most basic form of SVC, a video signal is represented by one base layer and one or more enhancement layers. An enhancement layer may increase the temporal resolution (i.e. the frame rate), the spatial resolution, or the quality of the video content, compared to what is available when decoding only a layer the enhancement layer is based on. Enhancement layers can be "stacked" on top of each other. In SVC, it is even possible to make an enhancement layer directly dependent on more than one "lower layer," and quite complex graphs of layer dependencies can be implemented, subject to the constraint, though, that in one access unit, generally corresponding to a video frame, a layer picture can directly depend only on one lower layer. Each layer, together with all its dependent lower layers, forms one representation of the video signal at a certain spatial resolution, temporal resolution and quality level. In this document a scalable layer representation is being referred to as one given layer together with all lower layers it directly or indirectly depends on. One scalable bit stream contains layers that form at least two, but sometimes many more scalable layer representations.

SVC retains H.264/AVC's Network Abstraction Layer, hereafter abbreviated with NAL, concept and key properties. NAL units form the basic structure of an SVC bit stream, and can be considered as being part of an access unit, itself corresponding to a video frame.

For transporting encoded video signals, the Real-time Transport Protocol, hereafter abbreviated with RTP is widely used. The basic RTP protocol as specified in RFC3550 of the IETF standard is used on the Internet for streaming applications and DVB-H/SH video broadcasting. As only the core functions of RTP are defined in RFC3550, complementary RFC's are needed to define the transport of specific coded video data into RTP. In this respect the RFC3984 was defined for specifying the transport of H.264 AVC NAL units.

New proposed extensions for RTP payload specifications such as these proposed for RFC3984 for incorporating SVC encoded video, support encapsulating a single NAL unit, more than one NAL unit, or a fragment of a NAL unit into one RTP packet. A single NAL unit as specified in H.264/AVC can be included in the RTP packet "as is," and the NAL unit header co-serves as the payload header. Four types of aggregation NAL units are specified. The two single-time aggregation packet types, STAP-A and STAP-B allow encapsulating more than one NAL unit into one RTP packet that stem from the same picture (identified by identical RTP timestamp). The two multiple-time aggregation packet types (MTAP), can be used to aggregate NAL units from different pictures into one RTP packet. RFC 3984 also supports two types of fragmentation units, FU-A and FU-B, which enable fragmentation of one NAL unit into multiple RTP packets.

SVC, as all previous video compression standards, requires that syntactical entities of the bit stream such as NAL units, be presented to the decoder in a certain order, the decoding order. In case of H.264/AVC and SVC, the decoding order is the same as the encoding order and is expressed in constraints for the sequencing of the NAL units. Some H.264/AVC and SVC profiles allow a certain amount of NAL unit reordering without breaking compliance, but others do not. In any case, it is necessary to include mechanisms in the transport layer that allow for efficient NAL unit reordering.

As defined in IETF RFC3550, RTP supports packet reordering by the means of the RTP sequence number, and time synchronization between different RTP sessions by the means of the RTP timestamp and the RTCP sender reports.

The NAL unit decoding order, however, is not necessarily identical to the transmission order or the RTP packet order. For example, when the interleaved packetization mode of RFC 3984 is used, it is sometimes impossible to infer the correct NAL unit ordering from the aforementioned information. When transporting H.264 SVC layers in different RTP sessions, referred as RTP sessions multiplexing, the situation gets even more complicated. Early versions of the SVC payload draft have attempted to specify an algorithm for this NAL reordering process but the specification and implementation complexities were considered excessively high.

An alternative to this approach is an explicit signaling of the order of the NAL units in the packet stream. This requires that the RFC3984 interleaved mode is used, and the field DON (Decoding Order Number) of STAP-B, FU-B and MTAP packets is explicitly used to indicate the NAL unit decoding order across all layers and RTP sessions.

In the non-interleaved mode, where packets containing the DON field are not allowed, another approach is to explicitly indicate the NAL unit decoding order across all layers (Cross-Layer DON or CL-DON) through the use of the field DONC in PACSI NAL unit in an aggregation packet (STAP-A). This is quite complex and requires additional bandwidth.

In the non-interleaved or single NAL unit modes, another approach involves the concept of the synchronisation point, relying on the knowledge of the one-dimensional RTP sessions dependency path defined in the Session Description Protocol (SDP). This basically consists of analyzing packets' timestamps correlations and distribution across RTP sessions to identify and retrieve the order of the access units in decoding order. The order of the access units is retrieved by searching for a session synchronization point of the highest dependent session to the lowest, a synchronization point of a session Sx (defined as TS_Sx) being defined as a temporally aligned set of RTP packets (i.e all having the same timestamp) with at least one RTP packet in each session Sy with Sy superior or equal to Sx according the order of sessions dependency. Basically this approach involves the analysis of the packet's timestamps correlation and distribution across sessions to identify and retrieve the order of access units in decoding order, and the knowledge of session dependency path defined in SDP to retrieve the order of NAL units within each access unit.

Hence, any synchronization point refers to a specific access unit. Once NAL units are associated to access units, NAL units of each access unit are output following the order of the session dependency path, and the order of sequence number inside each session to retrieve the NAL unit decoding order inside each access units.

Issues/limitations of this latter method comprise a constraint on frame rate distribution among the different RTP sessions as the method only works for NAL units of the same time instance of an RTP session being also present in the RTP session which depends on this RTP session. This means that increasing order of frame rate must follow increasing order of session dependency.

It is an object of the present invention to provide a method of the above known kind, but which can solve the aforementioned problems of computational complexity, increased bandwidth or lack to cope with different frame rates, for retrieving packets of e.g. RTP/SVC sessions in the non-interleaved mode and/or single NAL unit mode. Similarly it is an object of the present invention to provide a device which is adapted to arrange the different packets in the correct order before providing them to the decoder.

According to the invention this object is achieved by the method including the step as described in claim 1. Similarly a device as described in claim 6 will be adapted to achieve this object.

In this way, instead of using the prior art concept of synchronisation points, the knowledge of frame rates contained inside each session is relied upon. The proposed method is more effective and more simple than the prior art ones and reordering of packets is possible even if the frame rate does not follow the session dependency order.

An additional characteristic feature of the present invention is set out in claim 2.

This will in addition solve another inherent problem of the prior art as in case of packet loss the prior art method based on the synchronization points may not be able to output all well received packets. So this prior art method stopped the reordering process at the session where the first packet loss was detected; and packets of higher sessions in the present and next access units were not output until the next access unit corresponding to a TS_S0 synchronisation point was found. A consequence is that well-received packets/NAL units of higher sessions were losts during possibly many access units, despite the fact that a video player could have implemented good SVC concealment technics using these well-received NAL units. By not considering RTP sessions where a packet loss is detected when searching for the session with highest frame rate and by not interrupting the cross layer reordering process when an error is detected in a session, the present method for reordering of packets is more robust to packet loss as packets are reordered even after a loss detection in lower sessions. Therefore video players implementing SVC concealment have the maximum available information in input.

Both principles can be combined in a simple iterative process.

Another characteristic feature of the present invention is set out in claim 5. Using the knowledge of frame rate contained per session by using signalisation information, which, in the case of SVC/RTP streams can be the Session Description Protocol, abbreviated by SDP, for detecting the flows with the highest frame rate, leads to a very simple implementation.

Additional features can be found in the appended claims.

The present invention relates as well to a device which is adapted to perform the claimed method and to a video receiver which includes such a device.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Figures 2A, 2B, 2C:
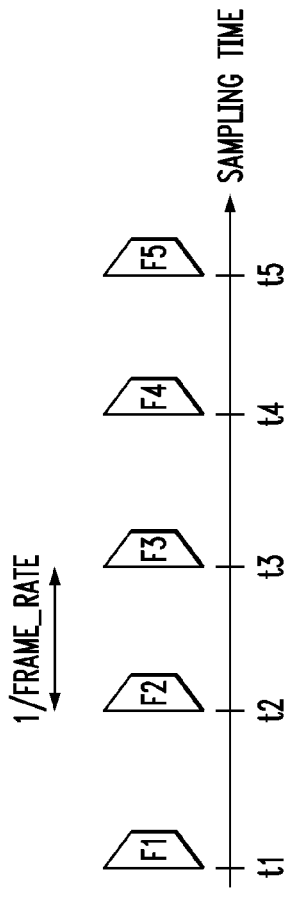
Figure 3A:
Figure 3B:
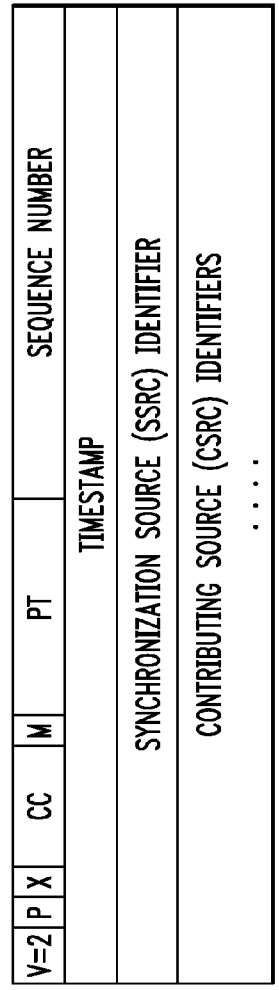
Figure 3C:
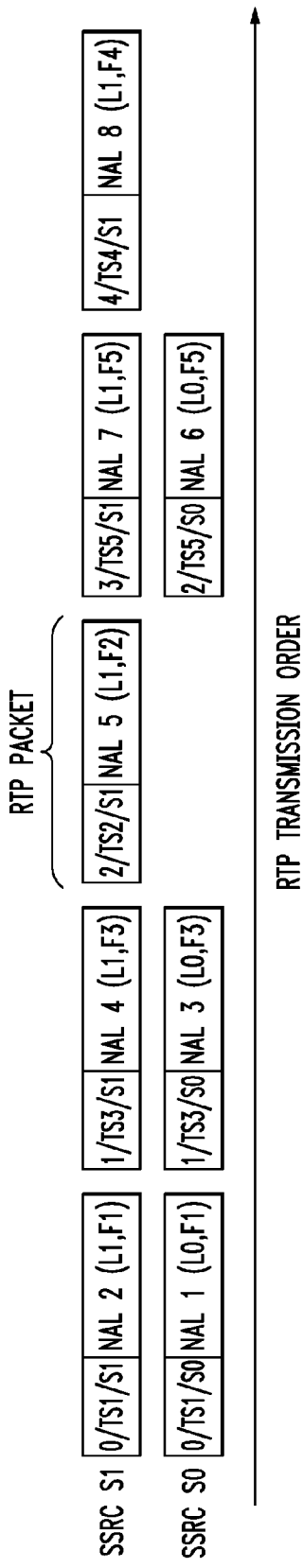
Figure 4:
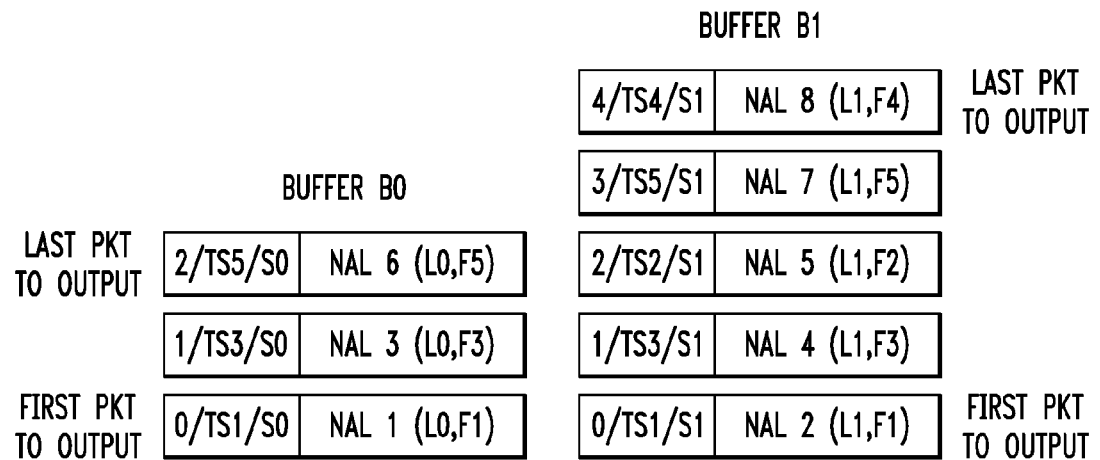

The above and other objects and features of the invention will become more apparent and the invention itself will be best understood by referring to the following description of an embodiment taken in conjunction with the accompanying drawings wherein:

FIG. 1 shows a basic architecture of a video transmission system,

FIGS. 2*a-c* show details of the encoding process on an example with SVC/AVC coded frames FIGS. 3*a-c* show further details of an encapsulation and transmission process for the example of FIG. 2, FIG. 4 shows part of the receiving process on the examples of FIGS. 2 and 3.

Figure 5:
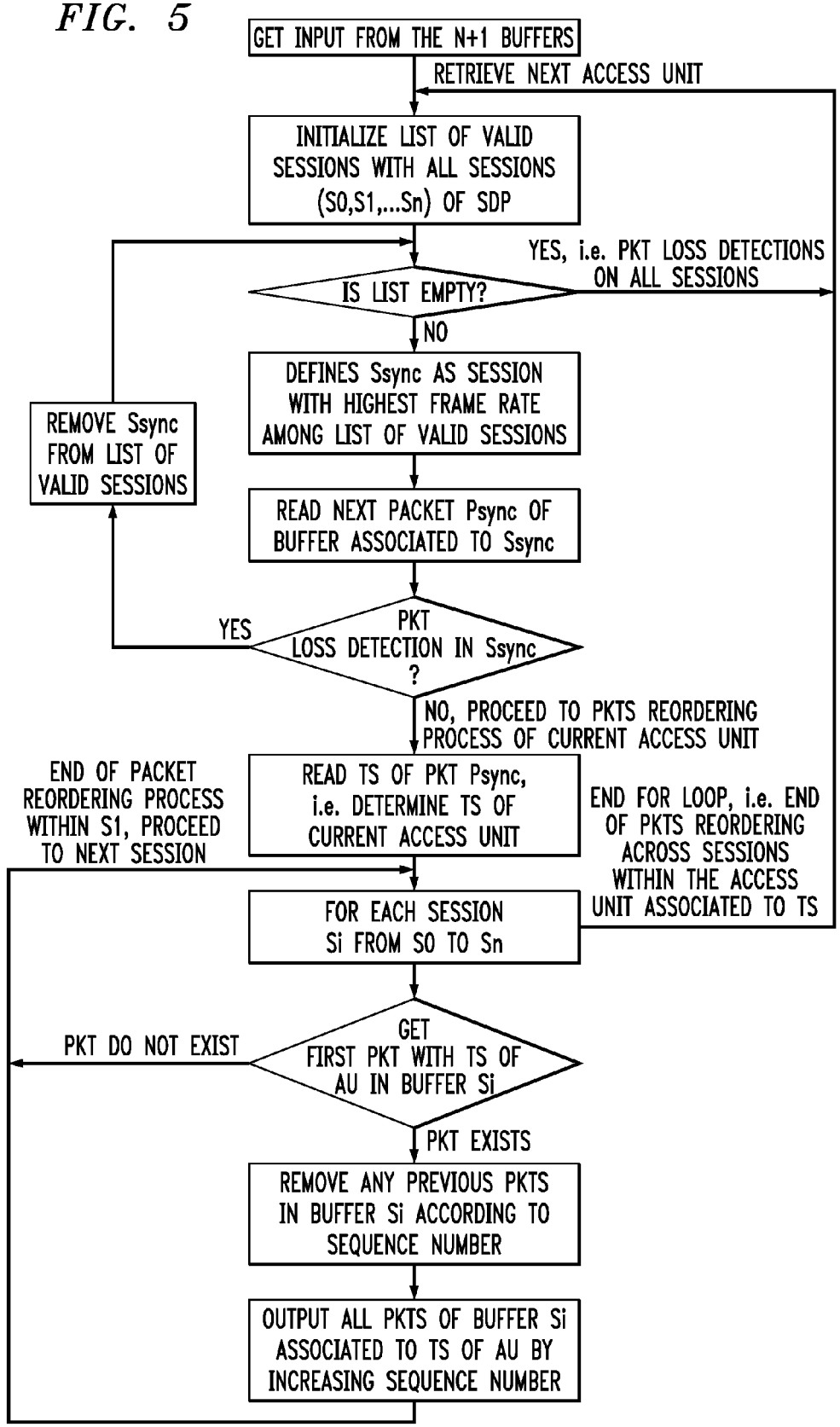
Figure 6:
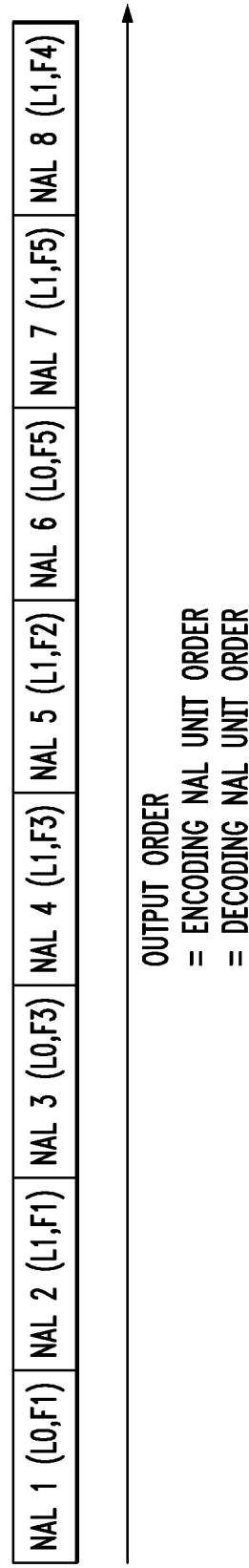

FIG. 5 shows an example of a detailed flow chart for performing the method according to the invention, and FIG. 6 shows the result after the reordering and multiplexing operation in accordance to the invention on the example set out in FIGS. 2,3 and 4.

The present invention may be used in multimedia coding such as video and/or audio coding appliances. More in particular this invention can be used in conjunction with scalable video codec, abbreviated with SVC, coding, of which the coded elementary units, called NAL units, are encapsulated and transported using RTP, being the real time protocol, using non-interleaved or single NAL unit modes. However it may be used in all areas where packets of multimedia data streams pertaining to interrelated sessions, need to be reordered so as to be compliant with a predetermined order as requested by the decoder. In general this sequence corresponds to the sequence generated by the encoder.

The SVC encoding method is standardized by the MPEG-4-AVC (part 10 of the ISO/IEC 14496) standard. To transport H.264 AVC, the RTP (real time transport protocol) payload dedicated to H.264 AVC is standardized by IETF RFC3984. SVC covers the whole application ranges of H.264/AVC, starting with low bit-rate Internet streaming applications to HDTV broadcast and Digital Cinema with nearly lossless coding and requiring dozens or hundreds of MBit/s.

The RTP payload format allows for packetization of a part of or one or more Network Abstraction Layer (NAL) units, produced by the SVC video encoder, in each RTP packet payload. The payload format has wide applicability, ranging from low bit-rate conversational, over Internet video streaming, to high bit-rate entertainment quality video.

In a well-known manner, a single SVC stream embedding different representation points or scalable layer representations is transported over several transport channels using the RTP protocol. This means that an SVC stream consists of several scalable layers, whereby each layer is transported over one separate RTP channel. These different representation points pertain to the same content, but offer different video format or quality to take into account specific receiver requirements. This is for instance the case when the same video content should target different screen sizes, e.g. QVGA for handhelds, HDTV for high end flat screen, VGA for PDA screen. This is represented using the SVC concept of layering, where one scalable bit stream contains layers that form at least two, but sometimes many more scalable layer representations. In this case, each SVC layer will be transported over a dedicated RTP session with possibly a different network path, with each SVC layer refining the video format or quality that can be retrieved from lower dependent layers. Each SVC layer, transported in one particular RTP stream, is to be decoded in combination with all dependent lower layers in the other RTP streams to retrieve the targeted representation point or SVC layer representation. The relationship between RTP streams pertaining to the same SVC video content, is indicated by means of the signalization protocol, being the SDP protocol in case of RTP streams. In this specific case, using draft standardized "a=depend" lines of each session will indicate RTP sessions belonging to each other. By using RTP payload for transporting such SVC encoded video streams, each consisting of a sequence of NAL units, it is possible that all these streams will arrive in a different order at the receiver. As mentioned previously, an important problem consist of resynchronising these NAL units at the receiver. This is important since the decoder needs to have them in the correct sequence as to enable decoding using SVC/H.264. The problem is even more difficult as these different SVC flows can thus be transported over different RTP sessions, via different channels having different delays.

Known procedures to solve this cross layer synchronisation mechanism have been discussed in previous paragraphs of this document and rely on the correlation between the "synchronized timestamps" (synchronization points), considering either Wall Clock time/timestamp mappings in RTCP sender reports for each RTP session or directly a common timestamps reference and scale for all RTP sessions. Yet other use the concept of Cross-Layer Decoding Order Number (CL-DON) or DON (interleaved mode) which uses the concept of one sequence number amongst different RTP sessions, which enables to find the correct sequence of packets spread over different sessions.

In FIG. 1 the basic architecture of such a global video transmission system is depicted and the basic steps for encoding using AVC/SVC protocol will be explained by means of FIGS. 2 and 3.

FIG. 1 depicts a video transmitter VT for transmitting a packetized stream containing encoded video data to a video receiver VR via a packet network PN such as the Internet network.

A video transmitter VT typically comprises typically a video capture device 1, a video encoder 2, an encapsulation device 3, a signalisation device 4, and a transmission network device 5. Implementations or embodiments for all these will now be discussed for an example using AVC/SVC encoding using RTP encapsulation and streaming.

The video transmitter VT of FIG. 1 comprises a video capture device 1 such as a video camera, capable of generating video frames with their associated sampling times. The stream generated by this capture device is depicted on FIG. 2a, and is composed of many frames identified by an index (F1, F2, F3, . . . ) associated to sampling times (t1, t2, t3, . . . ). The sampling time is generally derived from a sampling clock that is local to the capture device, and which triggers the optical sensor of the camera. For capturing devices running with a constant frame rate, a fixed time period between successive frames is obtained. Frames at the output of this capture device are delivered by increasing order of sampling time as shown on FIG. 2a, this increasing order being the same as the frame index order, which is also the required display order. Such capture devices are not only limited to camera devices delivering live video scenes, but may consist of any device capable of delivering frames by increasing order of sampling time, with sampling instances associated to each frame, including any device delivering stored or live video content (live channel, VoD platform), locally generated or coming from an external video content provider. The sampling times associated to frames are forwarded to the video encoder 2, in this example being a SVC encoder, to trigger the encoding process of frames and to the encapsulation device 3, in this example being an RTP streaming device which will use this information to set RTP timestamps in the case of an RTP streaming device.

The H.264 SVC video encoder 2, also included in the video transmitter VT, is adapted to encode the stream of frames as received from the capture device 1, into a set of at least two scalable layers that are interrelated to form a set of presentation points providing different spatial/temporal/quality video format. In FIG. 2b, an example of a configuration of an SVC video encoder is shown. In this example an SVC stream including two layers L0 and L1 is shown, such that decoding of L0 only leads to a presentation point at QCIF being a screen size format of 176×144 pixels, and in this example, a frame rate of 15 frames per second is chosen and decoding of L0 together with L1 leads to a presentation point at CIF, corresponding to 352×288 pixels, being another example of another display format with a chosen frame rate of 30 frames per second. With such a configuration, and in general with configurations relying on temporal scalability based on hierarchical B frames, the order of frames at the input of the encoder, which were related to the order of the sampling times, and being equivalent to the frame index of FIG. 2a, and shown by the line "frame/AU idx" on FIG. 2b, is different from the encoding order of frames/access units at the output of the video encoder which is shown by the line "AU encoding order" on FIG. 2b. According to the SVC/AVC encoding scheme, the video encoder generates at its output a stream of NAL units ordered by encoding NAL units order, depicted on FIG. 2c. This figure indicates for each NAL unit the layer and frame index the NAL refers to; e.g first NAL 1 is related to content of scalable layer L0, frame index F1, second NAL 2 is related to content of scalable layer L1, frame index F1, third NAL 3 is related to layer L0, frame index F3, and so on . . . .

The video encoder also generates a set of encoding parameters, denoted PS, which will be further delivered to a signalisation device 4, which will be discussed in a further paragraph.

The video transmitter VT of FIG. 1 further includes a RTP streaming device 3, for encapsulating the incoming NALunits onto RTP packets according to one of the packetization modes defined in the RTP SVC specification RFC3984. As previously mentioned these such packetization modes comprise the "Single NAL unit" mode, "Non Interleaved" mode or "Interleaved" mode. In the example depicted on FIG. 3a, only "Single NAL unit" mode is considered by way of explaining the method. A person skilled in the art will however know how to extend the re-ordering method according to the invention for packets encapsulated using the non-interleaved mode.

Sinlge NAL unit mode uses only one Single NAL unit per RTP packet, as depicted on FIG. 3a. During the encapsulation step, each RTP header, as depicted on FIG. 3b and standardized from RFC3550, must be initialized following the following rules:

1. the sequence number is incremented for each RTP packet, each RTP session having independent sequence numbers starting with a random values. For clarity in the figures, random values are however not used, and sequence numbers start at value 1

2. the timestamp (TS) is set according to the sampling time of the data contained in the packet, i.e. to the sampling time (of FIG. 2a) of the frame the encapsulated NAL refers to. The TS value is computed using the following formula:

TS=sampling_time*TS_frequency+random_value with TS_frequency being defined at 90 kHz for H.264 AVC/SVC codec. There are two possibilities: a synchronized timestamp scale for all RTP sessions (same random values), or an independent non synchronized timestamp scale for each RTP sessions (that means selecting different random values). This will have a slight implication on the re-ordering process as will be explained in a further paragraph of this document.

3. SSRC (Synchronisation Source) identifies uniquely each RTP session. In practice, the SSRC values are set with non overlapping random values (S0, S1)

As a consequence the RTP streaming device 3 is adapted to map the different encapsulated NAL units of FIG. 2c according to their scalable layer index (L0, L1) to different RTP Sessions with SSRC S0 and S1, as shown in FIG. 3c. For example, NALunits from scalable layer L0 are to be transported onto RTP session with SSRC=S0, NALunits from scalable layer L1 are to be transported onto RTP session with SSRC=S1. In general N+1 different RTP sessions S0 to SN are generated by the RTP streaming device, as shown in FIG. 1

In our example, the output of the RTP streaming device 3 provides two RTP sessions S0 and S1, meaning that two streams of RTP packets, as depicted in FIG. 3c, and identified by SSRC S0 and SSRC S1, will be output. RTP packets are ordered according to a transmission order that is equivalent to the access unit encoding order. So examining the NALunits of RTP packets in transmission order, will reveal the frame or access unit order of FIG. 2b.

The video transmitter VT of FIG. 1 further includes a signalisation device 4, capable of generating a description of the multimedia service, in the SVC/AVC example using a textual description defined by the Session Description Protocol (SDP). This protocol in particular defines the SVC layers/RTP sessions dependency relationship, the frame rates contained in each SVC layer/RTP session, related UDP/IP address and ports, based on H.264 parameter sets information retrieved from the video encoder 2. This signalisation device is also responsible for implementing a signalisation transport protocol to exchange signalisation with the receiver through an IP network. Such signalisation transport protocols can for instance be RTSP, SAP or simply HTTP. The output generated by the signalisation device is denoted SDP in FIG. 1.

The video transmitter VT of FIG. 1 further comprises a Transmission network device 5 for multiplexing all incoming RTP and signalisation streams, for encapsulating the multiplexed packets in packets for transmission over a packet network, such as IP packets for transmission over an IP network such as the Internet, possibly with different destination addresses if using video delivery in multicast mode.

Such a packet network PN such as an IP network is responsible for routing and transmission of packets to the destination address. Each packet can follow a different network path, hence suffering from variable delays, suffering from packet loss, and without the guarantee of keeping the transmission order at the receiver. The real transmission time of each RTP packet as output by the RTP device will thus be dependent on the used network interface that will possibly implement some flow control or traffic smoothing mechanisms. Hence, in a general manner, the transmission should be seen as an asynchronous process consuming RTP packets of each RTP session at undetermined times.

A the receiver side, a typical video receiver VR able to retrieve a packet stream such as an IP stream from a packet network such as the IP network, in general comprises a network interface 6, buffers B0 to BN, a signalling device 7, a decoder 8 and a display device 9. Depending on the particular encoding/encapsulation protocols used, a reordering device R may also be necessary, such as in the case of this document. Again all blocks will be briefly described, having embodiments for further processing the data as from the example of FIGS. 2 and 3. The re-ordering device R according to the present invention will be described into more detail.

The receiver network interface 6 is able to demultiplex the received packet stream into the different application streams, consisting of the RTP streams and the signalisation transport stream, to feed the different RTP buffers B0 to BN in accordance with the values of the SSRC included in the RTP header of each incoming RTP packet, and to feed the receiver signalisation device 7 with signalisation packets. Demultiplexing is done using existing procedures such as routing IP packets according to their IP multicast destination address in case of received IP packets, or according to their UDP destination port, or according to their RTP SSRC.

The RTP buffers are able to store successively received RTP packets related to each RTP session S1 to SN as delivered by the RX network interface. These buffers are fed in an asynchronous way, following real reception times of each RTP packet. Buffers are also responsible for sorting RTP packets according to their sequence numbers so as to reorder the RTP packets because the packet network in general does not guarantee the correct transmission order. RTP buffers also absorb the different variable delays introduced by the network, so they are also called dejittering RTP buffers. Following our example of the transmission of the two layers/RTP sessions, after reception of the last transmitted packets of FIG. 3c, we get the content of each RTP buffer B0 and B1 as depicted on FIG. 4. These buffers contain RTP packets in the transmission order, identified by their sequence number, a timestamp (TS) value and a SSRC, stored in different memories/buffers slots. FIG. 4 also shows for each buffer, which RTP packets will be outputted first and last, for serving as input to the reordering device R, this order being equivalent to the RTP sequence number order of each RTP session.

The video receiver VR further comprises a signalisation device 7, which, in an embodiment for processing the data of our example, is responsible to get the corresponding SDP description by any signalisation transport protocols, and to deliver session dependency information and frame rates per session to the reordering device and H.264 parameter sets to the SVC decoder device 8. In FIG. 1, these H.264 parameter sets are indicated as PS data, whereas the other SDP information delivered to the reordering and multiplexing device R is denoted as I.

The video receiver further includes an SVC decoder 8, for decoding NAL units received in the correct sequence, called NAL unit decoding order, which corresponds to the earlier encoding order. As this required order is not the same as the order which comes out straight from the RTP buffers, and as some multiplexing is to be performed, a reordering and multiplexing device is necessary. This will be discussed more extensively in a next paragraph.

In any case, this reordering and multiplexing device will deliver the NAL units in the correct sequence to the decoder, which will accordingly be able to retrieve the original frames in displaying order. The frames at output of the SVC decoder 8 are triggered by the sampling times, and are finally delivered to a display device 9 such as a CRT or other display, capable to display the incoming frames in frame display order, cadenced by sampling times associated to each frame.

A re-ordering and multiplexing device according to the invention is adapted to first identify a common timing variable such as the synchronised timestamp TS, being the RTP header timestamp related to the sampling time of FIG. 2a, associated to the next access unit or frame, by reading this TS value of a next packet of buffer Ssync, Ssync being the RTP session with the highest frame rate, and then to decapsulate all RTP packets across RTP sessions following sessions dependency to output NAL units in NAL unit decoding order as depicted on FIG. 6. We notice that FIG. 6 shows a similar order as FIG. 2c, that is the order we should respect to feed the SVC decoder 8. This device R thus retrieves sampling times associated to frames by reading the TS included in RTP headers of RTP packets associated to each AU and further provides this information to both the SVC decoder 8 and the Display device 9 to trigger the decoding process and the display of the resulting frame such that both devices are synchronized on the sampling times that were also used at the transmitter. The real time aspect of the video delivery is thereby guaranteed.

A remark is to be made with respect to the situation where either a common RTP timestamp scale is used for all RTP sessions (synchronized timestamps) or where different timestamp scales per RTP sessions (non-synchronized timestamps) are used on the other hand. In the latter case, the TS included in RTP header of each packet must first be translated in a common timing variable such as a common Wall Clock time reference using well-known mechanisms of RFC3550 (RTCP/Wall Clock mappings) before being read by the proposed algorithm.

The method and device according to the invention basically concerns block R as from the architecture depicted in FIG. 1. In general this packet multiplexing and re-ordering device R is adapted to receive packets pertaining to the different N+1 de-multiplexed RTP streams of the N+1 buffers S0 to SN in the video receiver VR, and further adapted to extract from them the NAL units and to put them into the correct sequence for further delivery to the decoder D as one single stream.

The method according to the invention basically involves two main steps: a first one comprises searching for the common timing variable such as the synchronized time stamp TS of the next RTP packet or a common Wall Clock time reference, which automatically refers to the next access unit AU or frame, in decoding order and of the stream with the highest frame rate, followed by a second step of outputting the packets in decoding order across sessions, following the order of the session dependency. As the decoding order relates to the encoding order, the method thus includes a step of searching within the packets of a stream having the highest frame rate amongst said multimedia streams, for a common timing variable of the packet associated with the next frame of said multimedia data, in a predetermined order related to the encoding process with which said data were encoded, and a step of providing the packets in said predetermined order across said sessions in the order of the session interdependency.

A detailed embodiment for implementing such a method is explained by means of FIG. 6. The method starts with receiving RTP packets from the RTP buffers, and in parallel determining a list of valid sessions, based on the output of the SDP signalization device 7. The list of valid sessions is thus received from 7, with all the required information per session. The list of valid sessions may be a subset of all sessions defined in SDP, depending of the terminal type, e.g a PDA will only subscribe to two valid sessions because the third one providing HDTV is not useful for a PDA. The selection of which sessions will be used is related to the video receiver itself, and is in general hard coded in the device and is related to the performance of embedded components, e.g CPU speed, total available memory, screen size, video decoder profile, . . . .

Next the RTP session with the highest frame rate is to be searched. A simple solution concerns determining an internal variable, denoted Ssync, which refers to the Session number of the session with the highest frame rate amongst a list of valid sessions. Finding the session of highest frame rate can be done by reading all lines "a=framerate" associated to RTP sessions in the SDP protocol received by the signalization device 7 and finding the session identifier associated with the max "a=framerate" value. Another method to compute the frame rate of each session, which is done in device R would be to find the minimum difference of timestamps between two packets within the considered session, with the inverse of the difference giving the frame rate. This frame rate computation step should be done on each RTP session. E.g for session L0, the minimum difference between timestamps is 2, for session L1 the minimum difference is 1, hence L1 is a session of higher frame rate because 1>½). The session with the highest frame rate gets the attribute "Ssync" Ssync is an internal variable that stores the identifier of the RTP session of highest frame rate, e.g. Ssync=S1 in our example. Once this specific Ssync is found, the RTP stream with the highest frame rate is thus also found, and the next packet of the buffer associated with Ssync, being B1 in our example in FIG. 4, this packet being referred to as Psync, is read. An optional step may consist of detecting packet losses in this RTP stream with the highest frame rate. In case packet loss is present, i.e Psync reveals a gap in sequence numbers within session Ssync, the next RTP stream of highest frame rate is searched by means of searching another value for the Ssync variable, after which step the procedure of determining the next packet Psync is repeated again using the next Ssync. In case a Ssync with no packet loss is found, the synchronized Time Stamp TS included in the RTP header of packet Psync associated to Ssync is read. In the example of FIG. 4, the RTP stream with the highest frame rate is stream S1 stored in buffer B1, and the timestamps of the different RTP packets are then extracted. Packets ordered by sequence numbers in this S1 session with the highest frame rate are inherently present in all access units, because it has the highest frame rate, so no Access Unit is skipped. Therefore their sequence numbers map the decoding order of access units decoding order. This first timestamps thus correspond to TS1.

The second step of the method then consists of outputting the packets in decoding order across sessions, following the order of the session dependency.

An embodiment for this second step is using the order of session dependency defined in the signaling Session Description Protocol (SDP) as shown in the lower part of FIG. 5. The session dependency defines the decoding order of NAL units within the access unit. NAL units belonging to lowest dependent session should be outputted first, and NAL units of the highest dependent session should be outputted last. In our example, this means that NAL units of session L0 should and belonging to the same access unit, thus having the same time stamp, should be output earlier than those of L1. Within each session, the decoding order of NAL units is retrieved by following sequence numbers. Hence, in the second step of proposed method, sessions are processed in a loop starting from the lowest dependent session S0, in our example being session L0, to the highest dependent Sn, in our example being session L1. Then, for each session Si of the loop, the first packet of a certain timestamp TS associated to current access unit is searched in the buffer of session Si. If at least one packet exists, it means that session Si contains at least one packet of current access unit. Any packets previous in sequence number to packet of current access unit are removed from buffer Si; these late packets can be present in a session in case of temporary high peak network delay, and are removed at this step to avoid memory overflow. Then all packets of buffer Si with timestamps equal to TS of current access units are outputted by increasing order of sequence number, following the NAL unit decoding order within a session. If no packet with TS of current access unit exists in buffer Si, it means that there is no available NAL unit in this session for the current access unit because the frame rate of this session is lower than highest frame rate and there is no presentation point associated to Si for this access unit or because the packet associated to current access unit is lost during network transmission. In both cases, there is no NAL unit in Si to output, and we proceed to next session. All sessions are processed to retrieve the NAL unit decoding order across all sessions of the current access unit in the loop from S0 to Sn. At end of this loop, we proceed to next access unit by repeating the whole algorithm.

The final result for the example of FIGS. 2-4 is depicted in FIG. 6, wherein the order in which the NAL units extracted from the different RTP packets is shown, as these will finally be output by the reordering device to the decoder. As can be readily observed, this order is the same as the encoding order or FIG. 2c, which was the aim of the method.

It is to be remarked that the following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the principles of the invention have been described above in connection with specific apparatus, it is to be clearly understood that this description is made only by way of example and not as a limitation on the scope of the invention, as defined in the appended claims.

The invention claimed is:

1. A method for reordering and multiplexing multimedia packets from multimedia data streams pertaining to a plurality of interrelated sessions having an interdependency relationship, said multimedia packets being associated with at least one frame of said multimedia data streams, said method comprising:

identifying a multimedia data stream having a highest frame rate amongst said multimedia data streams;

searching within the packets of said multimedia data stream having the highest frame rate amongst said multimedia data streams for a common timing variable of a packet associated with a next frame of said multimedia data stream, said next frame being selected in decoding order, and providing packets having the same value of said common timing variable across said sessions in the order of session interdependency.

2. The method according to claim 1 wherein said one multimedia data stream having the highest frame rate is searched from the received multimedia data streams having no loss of data packets.

3. The method according to claim 1 wherein said interrelated sessions are real time transport protocol sessions.

4. The method according to claim 1 wherein said decoding order is related to a scalable video codec encoding process, and said interrelated sessions transport scalable layer representations of a common multimedia content.

5. The method according to claim 1 wherein signalization information is used for determining the multimedia data stream with the highest frame rate.

6. A device for reordering and multiplexing received multimedia packets from multimedia data streams pertaining to a plurality of interrelated sessions having an interdependency relationship, said multimedia packets being associated with at least one frame of said multimedia data streams, said device comprising:

a receiver operative to receive said packets from said multimedia data streams, a selector operative to select a stream having a highest frame rate amongst said multimedia data streams, a searching component operative to search within the packets of said multimedia data stream having the highest frame for a common timing variable of a packet associated with a next frame of said multimedia data stream, said next frame being selected in a decoding order, and a transmitter that is operative to provide the packets having a same value as said common timing variable across said sessions in the order of the session interdependency.

7. The device according to claim 6 wherein said selector is further operative to search said multimedia data stream having the highest frame rate from these received multimedia data streams having no loss of data packets.

8. The device according to claim 6 wherein said interrelated sessions are RTP sessions.

9. The device according to claim 6 wherein said decoding order is related to a scalable video coding encoding process, and said interrelated sessions transport scalable layer representations of a common multimedia content.

10. The device according to claim 6 further including an analyzer that is operative to analyze signalization information for determining the multimedia data stream with the highest frame rate.

11. The device according to claim 6 implemented in a Video Receiver.

* * * * *